April 11, 1950   J. TREFIL   2,504,057

DIAPHRAGM VALVE

Filed June 22, 1945   2 Sheets-Sheet 1

Inventor:
James Trefil
By Joseph O. Lange Atty.

April 11, 1950   J. TREFIL   2,504,057
DIAPHRAGM VALVE

Filed June 22, 1945   2 Sheets-Sheet 2

Inventor:
James Trefil
By Joseph O. Lange
Atty.

Patented Apr. 11, 1950

2,504,057

UNITED STATES PATENT OFFICE 2,504,057

DIAPHRAGM VALVE

James Trefil, Berwyn, Ill., assignor to Crane Co., Chicago, Ill., a corporation of Illinois Application June 22, 1945, Serial No. 601,021

1 Claim. (Cl. 251—31)

This invention relates to valves. More particularly it pertains to a novel valve construction more commonly termed a diaphragm valve, in which the use of the usual stuffing box is avoided by employing a diaphragm seal around the valve stem and in which the outer portion or periphery of the diaphragm is preferably secured to outer limits of the valve chamber. The inner portion of the diaphragm has an annular fluid-tight connection with the valve disc or closure member.

At the outset, in acquiring a true appreciation of the merits of this invention, it must be understood that it has long been a problem in connection with the design and construction of this type of valve to provide a valve in which the fluid flow therethrough is relatively unimpaired and in which pressure drop, friction losses, turbulence, back pressure and the like are reduced to a minimum. For example, in prior valves of a similar type it has been found that the flow of fluid through the valve is very definitely restricted and accordingly the valve services are limited to certain specific installations in which pressure drop and the other named objections would not be a serious factor.

Therefore it is one of the more important objects of this invention to provide in a diaphragm valve of substantially Y-pattern form a structure which is relatively simple and economical to manufacture. It has been found after significant tests of this novel combination hereinafter described that fluid flow therethrough is provided which is free of substantial turbulence, pressure drop and objectionable friction losses.

Other objects and advantages will become readily apparent upon proceeding with the specification read in light of the accompanying drawings, in which Fig. 1 is a sectional assembly view of a rising stem valve embodying my invention.

Similar reference characters refer to similar parts throughout the several views.

Figure 1:
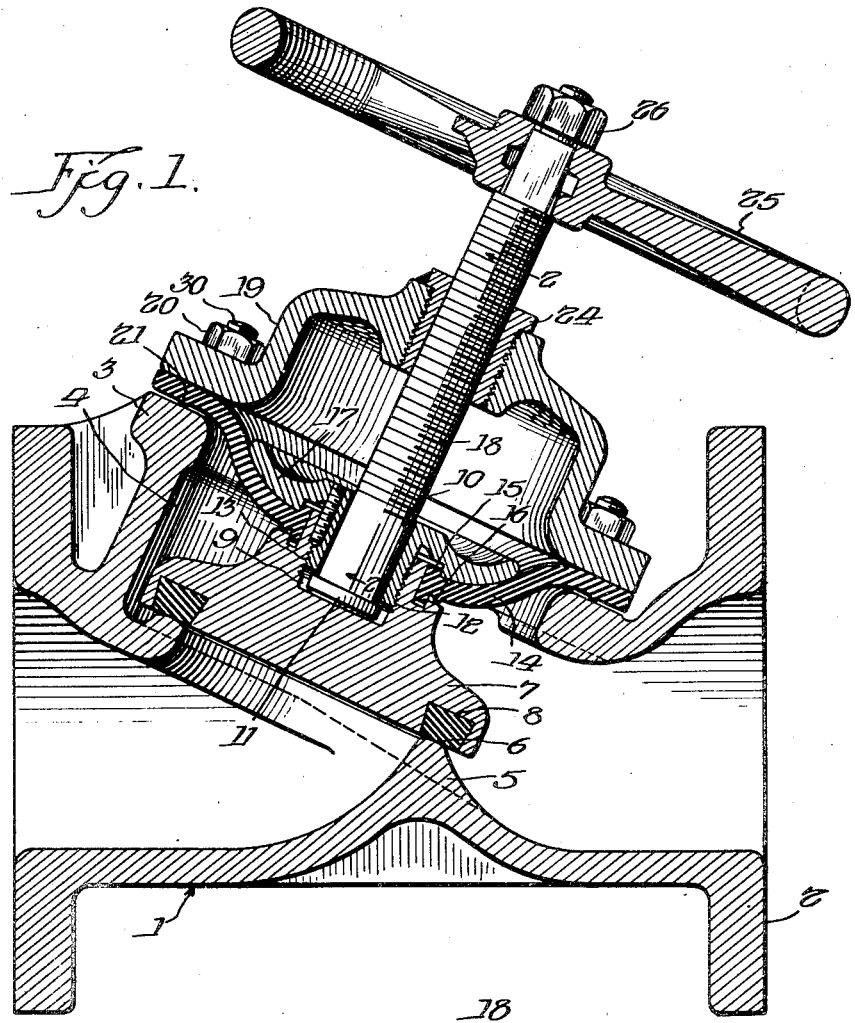

Referring now to Fig. 1, the novel valve body or casing generally designated 1 is shown having the conventional connecting end flanges 2 for the usual attachment to a pipe line (not shown). The manner and method of making the latter end flange connection is not significant and may vary substantially from that illustrated, depending upon the size, type of service and line pressures for which the valve is intended. The upper or bonnet connecting portion of the valve body 1 is preferably inclined from the vertical axis at an angle, as indicated, the annular flanged portion 3 thus defining the upper limits of the valve chamber 4. At the lower portion of the valve chamber 4 and also extending at an angle to the central axis of the valve casing an annular bridge wall or seat 5 is provided, and having at its upper portion a rounded valve seating surface 6 upon which, in the closed position of the valve, a closure member 7 is mounted having the composition insert 8 preferably of annular form for contact with the valve seating surface 6. At its upper end, the closure member 7 is provided with a hollow recess 9 within which the lower end or head portion of the stem 11 is positioned and is held in locked relation therewith by means of a stem ring 12 threaded as at 13 thereby to prevent the stem head end from being withdrawn but yet permitting the stem proper to be freely revolvable for purposes of closure member actuation as hereinafter described.

The seat 5 is pitched at an angle from the vertical axis of the valve casing sufficient to permit substantially unobstructed fluid flow therepast.

Figure 2:
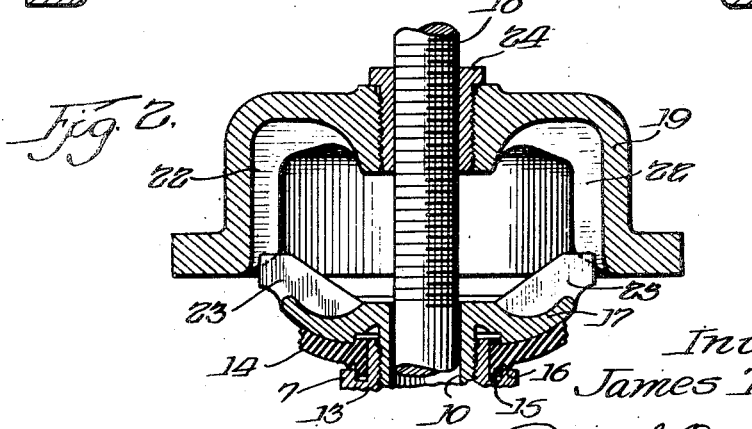
Fig. 2 is a fragmentary sectional view taken on the line 2—2 of Fig. 1.

Preferably interposed between the disc stem ring 12 and the upper portion of the closure member 7 is a dished diaphragm 14, which may be made of rubber or any suitable composition, the outer annular portion of the diaphragm being held in clamped relation against the integral bonnet flange 3, as indicated, while the inner periphery is preferably provided with the annular flange 15. Also in annularly disposed relation thereto the integral raised face 16 is provided, such annular projection serving to effect a high unit contact surface area whereby fluid tightness is more easily maintained. The upper portion of the disc stem ring 12 is suitably dish-shaped as indicated at 17 to conform with the similar configuration of the diaphragm thereby preventing internal pressure within the valve chamber 4 from forcing the diaphragm 14 outwardly under the influence of the internal pressure load. The valve stem 11 which is threaded, as indicated at 18, is of the rising stem type and it is therefore desirable in order to inhibit any tendency of the closure member 7 to rotate. This is accomplished in a manner as hereinafter explained. The bonnet 19 is held by any suitable means such as by the studs 30 and the nuts 20 to the casing 1 and thereby clamps the outer annular portion of the diaphragm 14 firmly in place in fluid sealing relation. Upon the underside of the diaphragm 14 it is preferable to provide an annular raised face, as indicated at 21, to form a more convenient and easily accomplished pressure sealing contact with the valve casing. As shown more clearly in the fragmentary sectional view of Fig. 2, the bonnet or cover 19 at its inner chamber portion is provided with a slot or groove 22 in which the diametrically extending sections 23 of the disc-stem ring 17 are slidably movable, thus effectually preventing the closure member and also the diaphragm from being rotated during actuation in opening and closing the valve. Thus objectionable twist or distortion of the diaphragm member 14 is avoided. At the upper portion of the bonnet, in order to provide a threaded bearing for the rising stem 10, a bonnet bushing 24 is suitably mounted, as indicated. On the upper portion of the stem, for purpose of effecting rotation of the stem, as desired, a handwheel 25 is positioned and is preferably held on the stem by means of the wheel nut 26.

Figure 3:
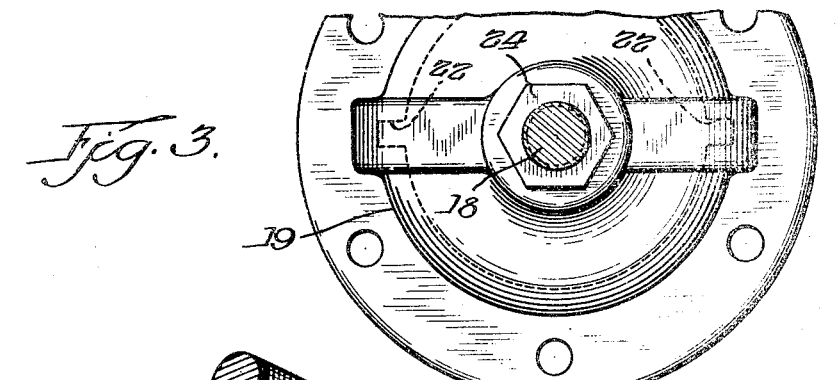
Fig. 3 is a fragmentary plan view of the sectional view shown in Fig. 2.
Figure 4:
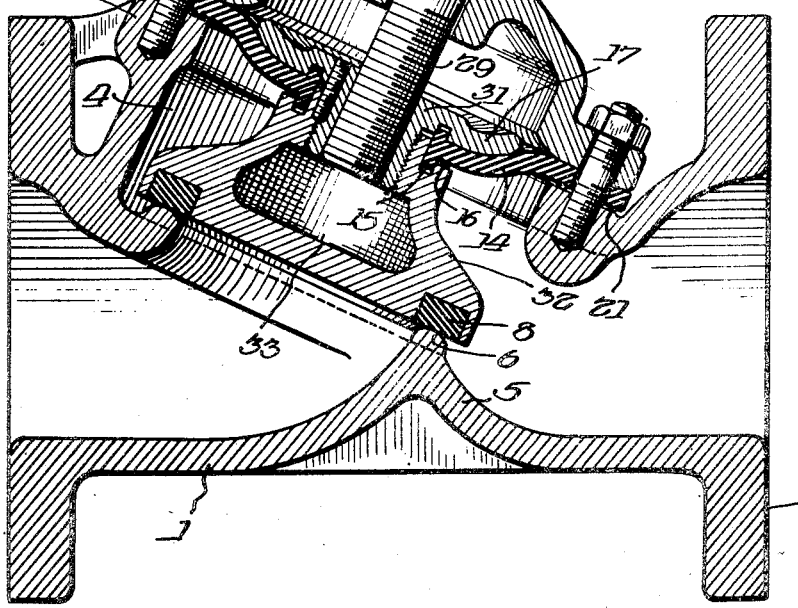
Fig. 4 is a sectional assembly view of a modified form of the invention applied to a valve incorporating a non-rising stem construction.

So far the description of my invention has been applied to a rising stem type of valve, but it is capable of being used in other modifications. For example, referring now to the modified construction shown in Fig. 4, a non-rising stem structure is shown. The stem 27, having a collar 28, is held against reciprocal movement but is threadedly connected as at 29 at its lower portion with the disc stem ring 31, the closure member 32 having a chamber 33 into which the lower portion of the stem 29 is receivable when the disc is in the raised or open position. The prevention of rotation of the closure member 32 and the diaphragm 14 is affected in a manner similar to that described in connection with Fig. 1 and which construction is shown in more detail in Figs. 2 and 3. The bonnet bushing 34 is somewhat shorter in length than the similar bushing 24 described in connection with Fig. 1 so as to hold the stem collar 28 in relatively fixed position insofar as reciprocating movement is concerned. The bonnet 35 is suitably formed to accommodate the bonnet bushing 34 as well as to provide for a substantial bearing for that portion of the stem 27 immediately below the collar 28.

In summary, because of the inclined valve seat 5 employed in both types of construction described, it will be readily apparent that in this kind of device an unusually beneficial result has been obtained. A valve has been provided in which substantially straight-through flow takes place and in which pressure drop, turbulence, and friction losses are reduced to a bare minimum.

It will be apparent from what has been above described that the invention is capable of numerous changes from the details shown and described without departing from the spirit or scope of the invention. It is the desire therefore to be limited within the spirit of the claim as appended hereto.

I claim:

A diaphragm valve comprising a casing having a valve chamber of substantially cylindrical form except for that lower portion thereof forming a transverse passage interrupting the side wall of the chamber, a flexible diaphragm defining the upper limits of the said valve chamber, a valve stem secured to the said diaphragm, a closure member secured to the said stem and diaphragm, the said closure member having a flat seat contact defining its lowermost limits, a bonnet closing the upper portion of the said casing, the said bonnet, stem, diaphragm and closure member being inclined at an angle relative to the said casing, a valve seat within the said valve chamber defining the lower limits of the valve chamber and the angle of inclination of said bonnet, stem, diaphragm and closure member relative to the said casing, the said bonnet having a substantial chamber portion, the said closure member having an unbroken outer peripheral diameter extending upwardly from the flat seat and snugly receivable within the upper peripheral limits of the cylindrical chamber when the valve is in wide open position, the length of the cylindrical valve chamber above the transverse passage being at least equal to the length of unbroken outer peripheral diameter of the closure member, the said diaphragm and an upper reduced portion of the said closure member being receivable within the bonnet chamber portion when the valve is in full open position.

JAMES TREFIL.

REFERENCES CITED

The following references are of record in the file of this patent:

UNITED STATES PATENTS

| Number | Name | Date |
|---|---|---|
| 171,344 | Boettcher | Dec. 21, 1875 |
| 930,635 | Warter | Aug. 10, 1909 |
| 1,983,106 | Sundstrom | Dec. 4, 1934 |